United States Patent
Lankreijer

(10) Patent No.: US 10,402,129 B2
(45) Date of Patent: Sep. 3, 2019

(54) METHOD TO OPERATE A COMPUTER FOR DIGITAL HIGH-CAPACITY PRINTING SYSTEMS TO RELAY PRINT DATA

(71) Applicant: Océ Holding B.V., Venlo (NL)

(72) Inventor: Herman Lankreijer, Hofsingelding (DE)

(73) Assignee: Océ Holding B.V., Venlo (NL)

( * ) Notice: Subject to any disclaimer, the term of this patent is extended or adjusted under 35 U.S.C. 154(b) by 0 days.

(21) Appl. No.: 15/839,303

(22) Filed: Dec. 12, 2017

(65) Prior Publication Data
US 2018/0173468 A1 Jun. 21, 2018

(30) Foreign Application Priority Data
Dec. 16, 2016 (DE) .................... 10 2016 124 605

(51) Int. Cl.
*G06F 3/12* (2006.01)
*G06F 9/54* (2006.01)
*H04L 29/08* (2006.01)

(52) U.S. Cl.
CPC ............ *G06F 3/122* (2013.01); *G06F 3/1224* (2013.01); *G06F 3/1282* (2013.01); *G06F 9/545* (2013.01); *H04L 67/125* (2013.01)

(58) Field of Classification Search
None
See application file for complete search history.

(56) References Cited

U.S. PATENT DOCUMENTS

| | | | | |
|---|---|---|---|---|
| 5,666,532 A * | 9/1997 | Saks | ............ | G06F 16/10 707/613 |
| 6,624,906 B1 * | 9/2003 | Takemoto | .......... | H04N 1/00238 358/1.14 |
| 8,688,925 B2 | 4/2014 | Lankreijer | | |
| 2010/0042784 A1 * | 2/2010 | Lankreijer | .............. | G06F 9/52 711/118 |
| 2013/0254246 A1 * | 9/2013 | Lipcon | .............. | G06F 12/0866 707/823 |

FOREIGN PATENT DOCUMENTS

DE 69507940 T2 10/1999
DE 102008037651 B4 8/2010

OTHER PUBLICATIONS

Chapter 15, Oce PRISMAproduction Server, in book "Digital Printing, Technology and Printing Techniques of Oce Digital Printing Presses", 9th Edition, Feb. 2005. pp. 347-361.
"Kernel Hook-Prozess-Filter", Walter Sprenger, IT-Security-Special Mar. 2003. pp. 39-41 (including English machine translation).
German Search Report dated Mar. 13, 2017—International application 10 2016 124 605.0.

* cited by examiner

*Primary Examiner* — Dung D Tran
(74) *Attorney, Agent, or Firm* — Schiff Hardin LLP

(57) ABSTRACT

The disclosure relates to a method for operating a computer for digital high-capacity printing systems to relay print data. The computer can include an operating system. Print data can be written to a memory and read from the memory to relay the read print data to be printed onto a recording medium at a printer. Operating system commands can be used for writing and reading. At least the operating system command for writing data can be supplemented by a delay function. The delay function can delay the operating system command for writing based on process identifier information. The process identifier information can describe a read process.

17 Claims, 3 Drawing Sheets

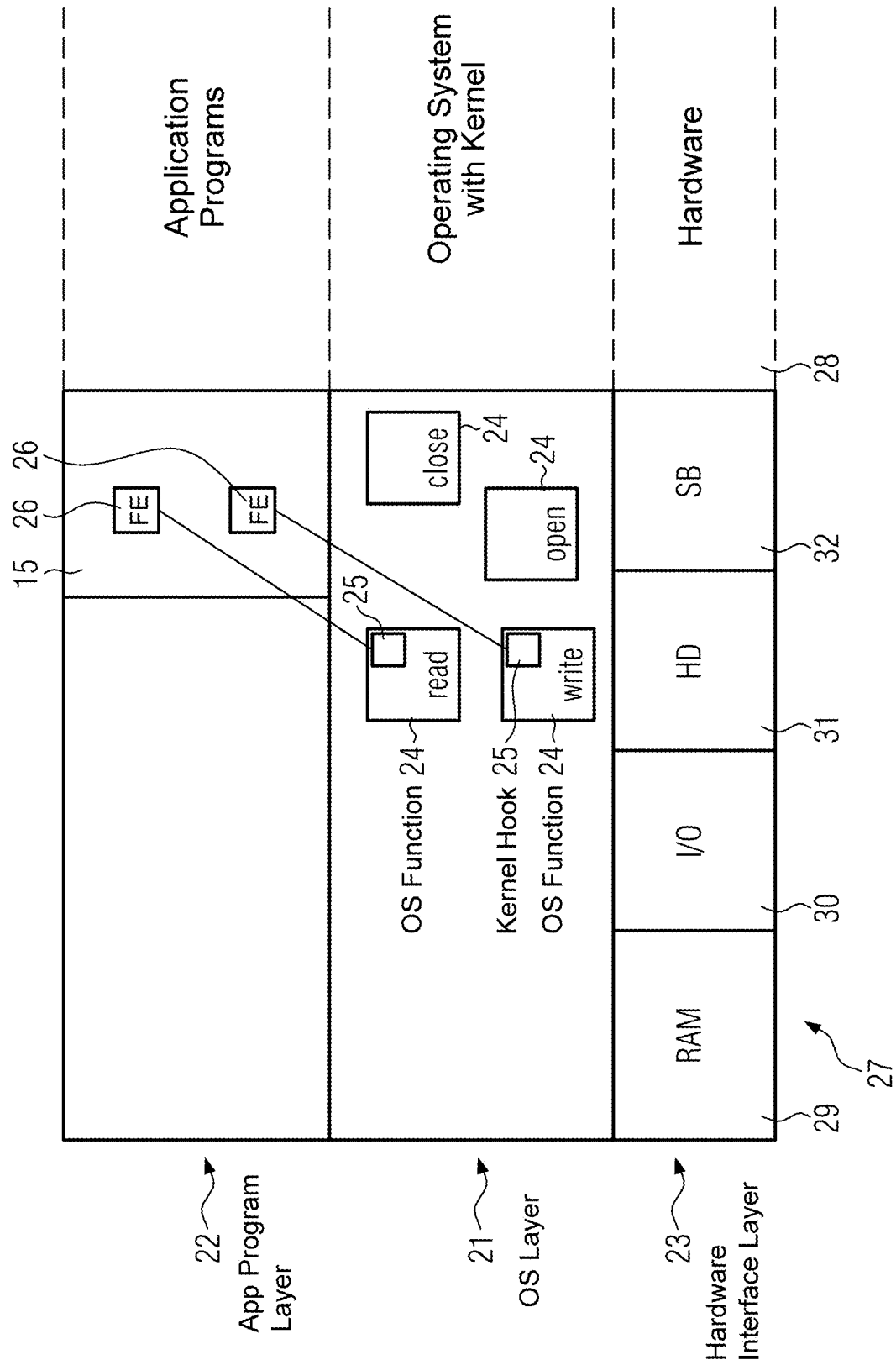

METHOD TO OPERATE A COMPUTER FOR DIGITAL HIGH-CAPACITY PRINTING SYSTEMS TO RELAY PRINT DATA

CROSS REFERENCE TO RELATED APPLICATIONS

This patent application claims priority to German Patent Application No. 102016124605.0, filed Dec. 16, 2016, which is incorporated herein by reference in its entirety.

BACKGROUND

The present disclosure relates to a method of operating a computer for digital high-capacity printing systems to relay print data, as well as a corresponding computer.

In chapter 15 of the book "Digital Printing, Technology and Printing Techniques of Océ Digital Printing Presses", 9th Edition, February 2005, ISBN 3-00-001081-5, print servers for high-capacity printers are described. Schematically shown herein is the workflow of a method used in an Océ PRISMAproduction document output management system for communication between two processes of a computer system for transferring print data.

Operating systems ("OS") are necessary for the operation of computers. These operating systems can include an operating system kernel as their central component. In the kernel, process and data organizations are normally established, upon which build additional software components of the operating system, and possibly of user programs. Requirements for a system kernel can include parallel processing of different tasks, what is known as multitasking; compliance with time-critical limits; and transparency for other applications.

Kernels can be constructed in layers, with the lower, machine-proximal layers forming the basis for those layers disposed above. The upper layers may thereby typically call functions of the lower layers, but not vice versa.

The following layers may be present, from the bottom to the top:
  interface layer for hardware (e.g. input/output devices, memory, processors)
  layer for memory administration, including virtual main memory
  layer for process administration (scheduler)
  layer for device administration (device management)
  layer for administration of the file systems.

If all of these functions or layers are integrated into the kernel itself, it is referred to as a monolithic kernel. In a microkernel, portions of this occur in separate processes. User processes also run outside of the kernel, and can operate the functions offered by the kernel to communicate with the aforementioned components of the computer.

Kernel hooks serve as an interface to enable the calling of a routine outside of the kernel at specific locations within a kernel. The use of kernel hooks is described in "Kernel Hook-Prozess-Filter" ["Kernel Hook Process Filter"], Walter Sprenger, IT-security-Special March 2003, Page 39 and the following, for example. With a kernel hook, a program code may be linked into an existing program. A kernel hook normally has unrestricted access to the entire system.

DE 10 2008 037 651 B4 describes a method for communication between two application programs that may be used for communication of print data in printing systems. A synchronization function is hereby used which allows the simultaneous execution of a write process and read process that access the same file. This synchronization function may be linked to the kernel of the operating system by means of a kernel hook.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 3 illustrates a software structure configured to execute a print data relay method according to an exemplary embodiment of the present disclosure.

Figure 1:
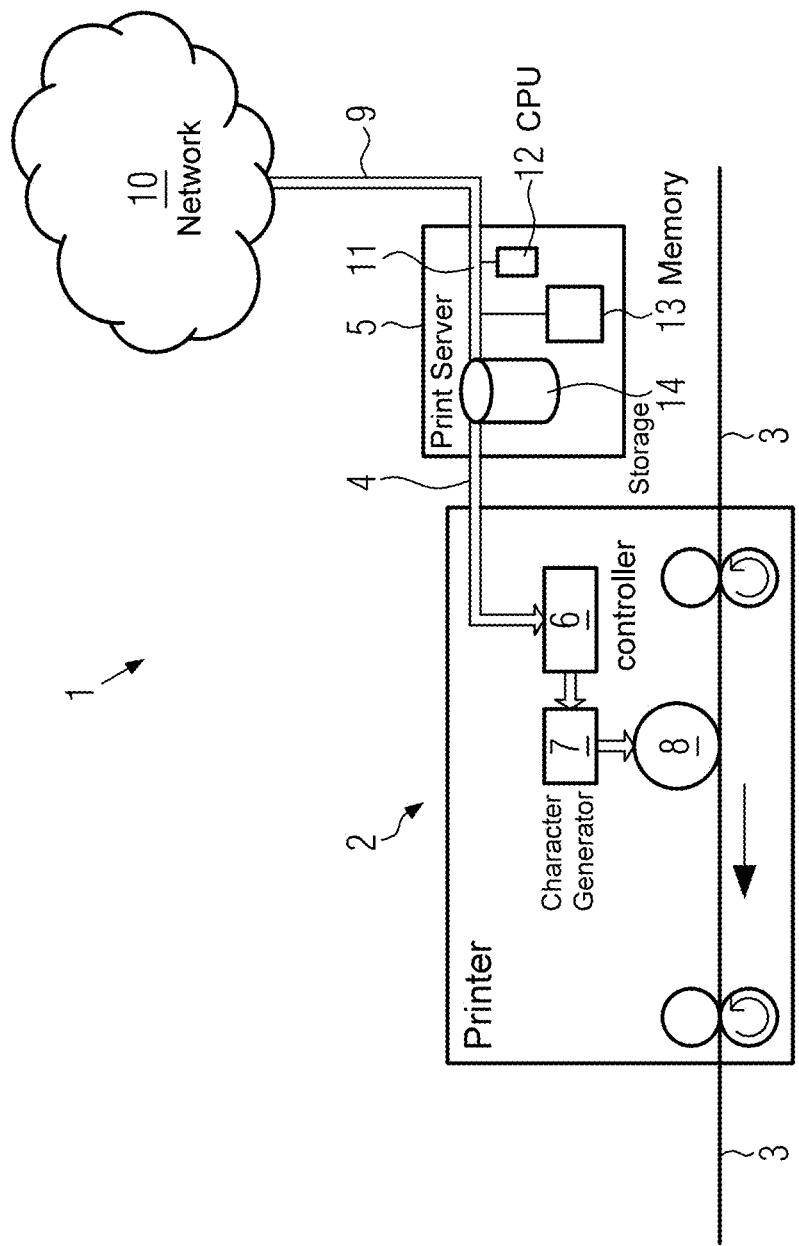
FIG. 1 illustrates a high-capacity printing system according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The disclosure relates to a method for operating a computer for digital high-capacity printing systems to relay print data in a simple and reliable manner, and thereby reducing or minimizing the danger that the relaying is interrupted. The disclosure also relates to a computer configured to perform a print data relaying method according to one or more exemplary embodiments.

A method according to an exemplary embodiment of the disclosure can include the operation of a computer for digital high-capacity printing systems to relay print data. In an exemplary embodiment, a computer including an operating system configured to perform the print data relaying is provided. In one or more exemplary embodiments, print data is written to a memory of the computer and, for relaying, are read from the memory to be printed onto a recording medium at a printing apparatus, such as a printer. Operating system commands are used upon writing and reading. In an exemplary embodiment, the operating system command for writing data can be supplemented by a delay function that that is configured to delay the operating system command for writing based on process identifier information which describes at least one read process.

Operating systems can include modules which control the execution of the individual commands. The modules can also be referred to as sub-operating systems. Priorities may also be set with these modules (sub-operating systems) so that certain commands are executed with higher priorities than other commands. In the Linux operating system, such priorities are established with the process scheduler and the Input/Output (I/O) scheduler. Generally, in operating systems, there is the principle that the writing of data always has a higher priority than the reading of data. It should therefore be ensured that data is not lost. It is assumed from this that the data are available for further processing if they have been written once to a predetermined memory, in particular to a non-volatile memory. However, the inventor of the present disclosure has recognized that this general prioritization scheme is extremely unsuitable for high-capacity printing systems. Given a high utilization of the computer with which the print data is relayed, situations may occur in which print data is not read from the memory and relayed to the printer because the computer is occupied with the writing of newly received print data. This may lead to an unintended halt or interruption (e.g. a "start/stop" or a "printer clutching") at the printer. An unintended halt of a high-capacity printer can lead to a significant waste of recording media. This waste may include multiple meters of a web of the recording medium. In addition to this, an unintended halt of a printer entails a longer printing pause since the printer must first be gradually shut down and subsequently gradually run up again. Such a printing pause entails a significant production outage.

According to an exemplary embodiment of the present disclosure, the operating system command to write data is delayed by a delay function based on process identifier information. As a result, the computing load of the computer (e.g. the input/output bandwidth load) may be decreased. An operating system command to read data is thus not negatively affected, and it is ensured that the necessary print data arrives at the printer without delay.

In an exemplary embodiment, the delay function is configured to delay the execution of the operating system command to write data so that a request to execute the operating system command is relayed to a kernel of the operating system with a delay. In this example, the execution of the operating system command to write data is delayed.

In an exemplary embodiment, the process identifier information is information about at least one read process executed at the computer that reads data from the memory of the computer.

In an exemplary embodiment, the process identifier information may also include information about the process that calls the corresponding operating system command that is delayed.

In an exemplary embodiment, the process identifier information may also include information about other processes that are executed at the computer. Given the presence of specific process identifier information, a corresponding delay is executed. Depending on the process identifier information, the delay function may decide whether a delay or no delay is executed. In an exemplary embodiment, the delay function may also adjust the duration of the delay based on the process identifier information. The duration of the delay is adjustable in a range from, for example, 0 to a maximum delay duration of 0.5 seconds, or a maximum delay duration of 1 second, or a maximum delay duration of 5 seconds, and in particular a maximum delay duration of 10 seconds to 60 seconds. The delay duration is not limited to these exemplary delay duration ranges and can be another duration or duration range as would be understood by one of ordinary skill in the relevant arts.

For example, if the process identifier information includes the information that a read process to read print data is executed, where the read process to read print data relays the print data to be printed at the printer, then the operating system command for writing is delayed or the delay time is set to a predetermined value that differs from 0.

In an exemplary embodiment, the process identifier information may also include a name or a process type of the process or processes executed at the computer (e.g. the read process or read processes and/or a status of the processes). Using the name or the process type, the delay function may recognize which process or processes are executed at the computer and control the delay accordingly. The consideration of the status of the processes may hereby be advantageous because, for example, processes that pause may be left unaccounted for in the control of the delay.

In an exemplary embodiment, the process identifier information may also include information about the print data. In high-capacity printing, in addition to the print data which should be printed onto the recording medium, accompanying print data (e.g. a job ticket) can be created and transmitted to the print server together with the print data. Relevant information may be extracted from this accompanying print data as process identifier information. For example, a delivery point in time at which the printed recording medium must be delivered may be included in the accompanying print data. Information about the quantity of print data to be read may also be determined from the accompanying print data. If the file of the print data is known, then the operating system also knows the size of the file and may determine the amount of print data to be read using this size.

In an example operation, as the amount of print data to be read increases, the delay duration to delay the writing of new print data can also increase.

In an exemplary embodiment, the process identifier information may also include information about the load state of the computer, such as information about the load of the bandwidths of the interfaces (I/O load). In an exemplary embodiment, the more that the computer is utilized, the need to delay the write commands increases so that sufficient computing capacity and/or bandwidths of the interfaces remain for the read process. Given a low load state, no/zero delay (or near zero delay) may be appropriate as it is ensured that the present print data may be read and relayed without delay.

In a method according to one or more exemplary embodiments, not only operating system commands for writing data, but also operating system commands for reading data, can be delayed, insofar as these operating system commands are executed by a process that does not relay the data to the printer or to a print head of the printer. In an exemplary embodiment, print data is further processed at a print server. For example, the print data can be converted from one print format into another print format. For this, the print data is read at the print server. These processes may be delayed relative to a read process with which the print data is relayed immediately to the printer or a print head of the printer.

In an exemplary embodiment, the operating system may include a kernel. The delay function may be linked to the kernel. In an exemplary embodiment, the delay function is linked to the operating system and/or the kernel with a kernel hook.

In an exemplary embodiment, the method is executed at a computer that is a component of a print server or a printer. If the method is executed at a computer that is a component of a print server, processes that directly relay the print data are those processes that relay the print data from the print server to the printer. In an exemplary embodiment, these processes can pass the print data to an interface to which is connected a data connection to the printer. If the computer is a component of a printer, the processes that directly relay the print data are those processes that relay the print data to the print head that is located in the printer.

A computer according to the present disclosure adapted for digital high-capacity printing systems, with which print jobs are received and relayed for printout on a recording medium, can include a central processing unit (CPU), a storage device (e.g. volatile and/or non-volatile memory) and a computer program. The computer program can be configured to execute a method according to one or more of the exemplary embodiments.

In an exemplary embodiment, the computer is a component of a print server or of a printer, but is not limited thereto.

A method according to exemplary embodiments of the present disclosure are explained in detail below. The method according to one or more embodiments can be implemented on or by a computer. In an exemplary embodiment, the method is adapted to relay print data in a printing system 1.

The printing system 1 shown as an example in FIG. 1 includes a printer 1. In an exemplary embodiment, the printer 1 can be a digital high-capacity printer configured to print to a paper web 3, but is not limited thereto. The printer 2 can be connected via a data line 4 with a computer or print server 5.

In an exemplary embodiment, the printer 2 includes a controller 6, a character generator 7, and a photoconductor drum 8. In the printer 2, the data line 4 can lead to the controller 6 in which the print data contained in the print data stream are prepared for the subsequently arranged character generator 7. The character generator 7 can be configured to generate control signals to activate the photoconductor drum 8 with which the print data are printed on the paper web 3. The character generator 7 and the photoconductor drum 8 form a print group. This is a digitally controlled electrophotographic print group. Instead of an electrophotographic print group, an inkjet print head or a print head operating according to a different printing technology may be provided. That is, the printer 2 is not limited to electrophotographic printing and can be an inkjet or other printer as would be understood by one of ordinary skill in the relevant arts. Instead of a web-shaped recording medium, a sheet-shaped recording medium may also be printed to. The recording medium may also be comprised of plastic, metal etc. and, for example, may include circuit boards. In an exemplary embodiment, the controller 6 includes processor circuitry that is configured to perform one or more functions and/or operations of the controller 6.

For high-capacity printers, the paper web 3 can be supplied from a roll. However, high-capacity printers can also be configured to print with very high capacity to individual sheets at high speed, in which the application of the various embodiments is likewise appropriate. Within the scope of this disclosure are high-capacity printers configured to print in a range from, for example, 40 DIN A4 pages per minute to well over 1000 DIN A4 pages per minute.

In an exemplary embodiment, the print server 5 is connected with a local or super-regional data network (LAN or WAN) via an additional data line 9.

In an exemplary embodiment, the print server 5 is a print server that caches, prepares and relays the print data stream, or a host at which the print job and the corresponding print data stream are generated. In an exemplary embodiment, the print server 5 is configured as the print server described in chapter 15 of the book cited above, "Digital Printing, Technology and Printing Techniques of Océ Digital Printing Presses", 9th Edition, February 2005, but is not limited thereto. In an exemplary embodiment, the print server 5 is integrated into the printer 2, but may be a separate component in other embodiments.

In an exemplary embodiment, the print server 5 includes a data bus 11, a CPU 12, a volatile storage 13 (e.g. RAM), and a non-volatile mass storage 14, for example a hard drive (hard disk, SSD). In an exemplary embodiment, the print server 5 is operated with a multitasking-capable operating system, for example Linux, Microsoft Windows (e.g. XP, 7, 10, etc.), Google Chrome OS, Apple Mac OS, or other operating system as would be understood by one of ordinary skill in the art. In an exemplary embodiment, the print server 5 can include processor circuitry (e.g. the CPU 12) that is configured to perform one or more operations and/or functions of the print server 5.

In an exemplary embodiment, the operating system includes (or is supplemented with) a delay function configured to delay a write process, and optionally configured to delay a read process, as is explained in detail below.

Application programs configured to prepare and relay a print data stream can be used at the print server 5. In an exemplary embodiment, each application program has at least one storage-related process that, upon processing the print data, singly or repeatedly accesses one or both of the storages 13, 14 using an unmodified standard function or a standard command of the operating system, for example write or read.

Figure 2:
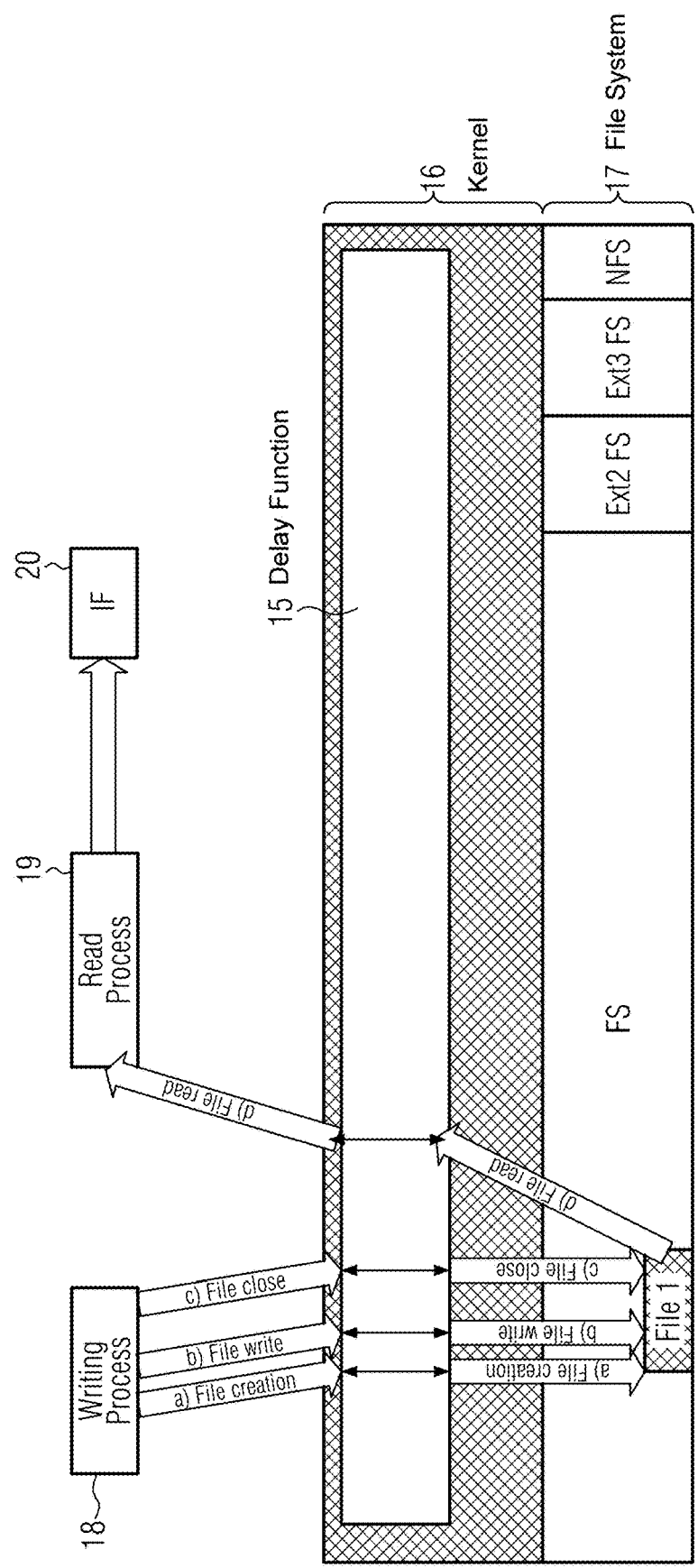
FIG. 2 illustrates a method workflow for relaying print data using a computer according to an exemplary embodiment of the present disclosure.

With reference to FIG. 2, a delay function configured to synchronize the communication of two storage-related processes of a computer system is described below.

In an exemplary embodiment, the delay function 15 is linked to the kernel 16 of the operating system, and in particular to the virtual file system (VFS), using one or more kernel hooks. In an exemplary embodiment, each kernel hook links a delay program or delay program module that produces the delay function with a respective operating system command for writing data, and possibly also for reading data. FIG. 2 shows the method workflow according to an exemplary embodiment. The delay function can be configured to act as if it is executed by the operating system although the delay program (or delay program module) is not a component of the operating system. Rather, the delay program can be stored outside of the operating system with, for example, the application programs, as is explained in more detail further below using FIG. 3.

In an exemplary embodiment, the operating system has a system-internal file system (FS) 17 that includes system files and application files. A write process 18 can be configured to write a file to a predetermined storage region with a standard operating system command of the operating system.

A read process 19 can be configured to read the file and relay the read file to an interface (IF) 20 which is connected with the printer 2 via the data line 4.

In an exemplary embodiment, the write process is executed in three steps. For example, initially a file is generated (step a), the data is then written (step b), and finally the file is closed (step c). These three operating steps are received from the delay function 15 in the operating system. The delay function 15 is transparent to these three operating steps, meaning that it executes these write or read processes fundamentally without modifications in the system and generates a corresponding file in the file system 17 (step a), writes the data into the file (step b) and closes the file (step c). The writing of the data (step b) may, however, be delayed by the delay function 15 within the operating system. In an exemplary embodiment, the delay function 15 is linked to the standard operating system commands for reading and writing that are supplemented by the special control function. In the region below the delay function 15, the writing and reading take place conventionally, with the write process and the read process being controlled using conventional operating system functions.

In an exemplary embodiment, at least the operating system commands for writing data into the storages 13, 14 may be delayed via the interposition of the delay function 15. For this, in an exemplary embodiment, the delay function 15 imports process identifier information which describes at least a read process. In particular, this process identifier information specifies whether this read process is executed. If a read process is executed, it may then be appropriate to delay the writing of a write process so that the reading by the read process is not negatively affected.

In an exemplary embodiment, the delaying may depend on one or more additional parameters of the process identifier information, for example:
the load state of the computer,
the amount of print data to be read, or the size of the print file to be read,
the name and/or the type of the read process, and/or
the status of the read process.

In an exemplary embodiment, the process identifier information may include not only parameters of a read process but also parameters of multiple read processes. The process identifier information may also include parameters of write processes, and in particular, of all write processes executed at the computer.

In an exemplary embodiment, the parameters contained in the process identifier information can indicate how strongly the computer is loaded and/or how important it is (e.g. an urgency) that the print data stored in the storages 13, 14 are read and relayed. In an exemplary embodiment, different sets of parameters may be used as process identifier information to describe both of these aspects. In an exemplary embodiment, it can be concluded whether a read process is executed (e.g. a read process that directly relays the print data) based on the process identifier information. As a result, the delay function can advantageously ensure that write processes do not severely utilize the computer so as to thereby ensure that the read process may be executed without interruption.

In an exemplary embodiment, the load state of the computer may be determined by different parameters, for example (but not limited to), the CPU load, the available free memory, the load of the interfaces (I/O load) which are used in the relaying of print data, or other parameters for describing load of a computer as would be understood by one of ordinary skill in the relevant arts.

In an exemplary embodiment, the process identifier information may describe direct or indirect priorities of the print data to be written and/or to be read. Direct priorities are parameters that explicitly describe (e.g. using a scale, or other quantifier) the importance of the print data and that the print data be printed out as quickly as possible at the printer. Indirect priorities are parameters, for example certain types of information, that are contained in print data which have a priority before other types of information. Furthermore, indirect parameters that describe the importance of the print data may, for example, be delivery times within which the print data must be printed onto a recording medium. A priority of the print data may then be determined, and the delay set accordingly, depending on the current time and the delivery time indicated in the process identifier information.

Depending on the situation in the respective printing system, different parameters may be reasonable as process identifier information and be used accordingly.

If the writing of one or more write processes is delayed, more computing capacity is then available to the read process or read processes. Advantageously, the danger/risk that the print data does not promptly arrive at the printer or at the print head of the printer, and therefore that a printing process must be interrupted, is hereby reduced.

In an exemplary embodiment, multiple parameters of the process identifier information are evaluated in combination so that a delay is only performed if it is actually necessary. For example, the load state of the computer may be detected. As of a predetermined high load state, it can be determined, for example, whether read processes are executed simultaneously, and whether the read processes are associated with print data are directly relayed or the print data is merely processed and stored again at the computer. The read processes that do not relay print data but rather only process the data, for example, may then be delayed. Via this combination of the evaluation of the load state and of the different types of read processes, all processes that do not directly relay print data may be slowed in a targeted manner according to an exemplary embodiment.

In an exemplary embodiment, given such a combination of parameters, it may also be reasonable to incorporate the priorities of the print data as well.

In an exemplary embodiment, via the delay function 15 linked to the operating system, an optimization of the data transfer is achieved without the corresponding application programs needing to be specially designed in this regard. Rather, a greater freedom is even achieved in the design of the application programs since only conventional operating system commands for writing and reading can be used. Application programs of different developers may hereby be used.

FIG. 3 illustrates a corresponding hardware and software structure according to an exemplary embodiment of the present disclosure. In an exemplary embodiment, a computer 27 can include a hardware interface layer 23 having control software for the hardware 28. The hardware 28 includes a microprocessor. The hardware 28 can also include a working system memory (e.g. random access memory (RAM)) 29 for operating system programs and user programs; input/output devices (I/O) 30 (for example, keyboard, mouse and monitor); a non-volatile storage 31 for operating system programs and user programs (e.g. a hard disk (HD or SSD)); and a system bus (SB) 32. In an exemplary embodiment, the computer 27 (including its corresponding hardware 28) can include processor circuitry that is configured to perform one or more operations and/or functions of the computer 27 (and corresponding hardware 28).

In an exemplary embodiment, the software structure includes two additional layers, such as the layer 21 of the operating system with the kernel and the layer 22 of the application programs. These two software layers 21, 22 are arranged above the hardware interface layer 23.

The kernel of the operating system, or its storage administration system, can include multiple functions 24. For example, the read, write, open and close functions 24 are depicted in FIG. 3, but other functions are also possible. The read and write functions have a kernel hook 25.

In an exemplary embodiment, the delay program producing the delay function 15 is configured in the layer 22 of the application programs. The delay function 15 can include individual function elements (FE) 26 that are respectively linked using a kernel hook 25 to one of the operating system functions 24. Upon execution of one of these operating system functions 24, the corresponding function element (FE) 26 of the delay function 15 is also respectively called. The individual function elements 26 may access shared data (e.g. shared control parameters) so that the shared complex control functions may be satisfied, such as the targeted delaying of the writing (and possibly the reading) of data.

Within the scope of the disclosure, it is also possible to configure the linking of the delay function with the operating system such that the delay function is integrated into the operating system. In an exemplary embodiment, program segments can form the delay function. The program segments do not need to be stored in a storage area for application programs, but rather can be stored in the storage area of the operating system and thus are an integral component of the operating system.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 printer
3 paper web
4 data line
5 print server
6 controller
7 character generator
8 photoconductor drum
9 data line
10 data network
11 data bus
12 processor (e.g. CPU)
13 memory (e.g. RAM)
14 mass storage
15 delay function
16 kernel
17 file system
18 write process
19 read process
20 interface (IF)
21 operating system layer
22 application program layer
23 hardware interface layer
24 operating system function
25 kernel hook
26 function element (FE)
27 computer
28 hardware
29 memory (e.g. RAM)

30 input/output devices (I/O)
31 non-volatile memory
32 system bus

The invention claimed is:

1. A method to relay print data for digital high-capacity printing systems using a computer including an operating system configured to write print data to a storage and to read the print data from the storage to relay the print data to print the relayed print data onto a recording medium at a printer, wherein reading and writing of the print data being performed using operating system commands, the method comprising:
supplementing an operating system command for writing data with a delay function, wherein the delay function is configured to relay a request to execute the operating system command to a kernel of the operating system with a delay to delay the operating system command; and
delaying the operating system command for writing data based on process identifier information corresponding to at least one read process.

2. The method according to claim 1, wherein the operating system command for writing data is delayed only if the process identifier information contains information that a read process for reading print data is executed to relay the read print data to be printed at the printer.

3. The method according to claim 2, wherein the process identifier information comprises a status of the read process and a name or a process type of the read process.

4. The method according to claim 2, wherein the process identifier information comprises information about an amount of print data to be read.

5. The method according to claim 2, wherein the process identifier information comprises information about a load state of the computer.

6. The method according to claim 1, further comprising adjusting a delay duration based on the process identifier information detected by the delay function.

7. The method according to claim 1, wherein the operating system comprises a kernel, the delay function being linked to the kernel.

8. The method according to claim 7, wherein the delay function is linked to the operating system using a kernel hook.

9. The method according to claim 1, wherein the method is executed at the computer that is a component of a print server or the printer.

10. A computer adapted to high-capacity printing systems, the computer being configured to receive and relay print jobs to printout the print jobs onto a recording medium, and comprising a central processing unit (CPU) and a storage device storing a computer program, that when executed, is configured to control the CPU to execute the method according to claim 1.

11. The computer according to claim 10, wherein the computer is a component of a print server or of the printer.

12. A non-transitory computer-readable storage medium with an executable program stored thereon, wherein, when executed, the program instructs a processor to perform the method of claim 1.

13. A method to relay print data for digital high-capacity printing systems using a computer including an operating system configured to write print data to a storage and to read the print data from the storage to relay the print data to print the relayed print data onto a recording medium at a printer, wherein reading and writing of the print data being performed using operating system commands, the method comprising:
supplementing an operating system command for writing data with a delay function; and
delaying the operating system command for writing data based on process identifier information corresponding to at least one read process, wherein the operating system command for writing data is delayed only if the process identifier information contains information that a read process for reading print data is executed to relay the read print data to be printed at the printer.

14. The method according to claim 13, wherein the process identifier information comprises a status of the read process and a name or a process type of the read process.

15. The method according to claim 13, wherein the process identifier information comprises information about an amount of print data to be read.

16. The method according to claim 13, wherein the process identifier information comprises information about a load state of the computer.

17. A method to relay print data for digital high-capacity printing systems using a computer including an operating system configured to write print data to a storage and to read the print data from the storage to relay the print data to print the relayed print data onto a recording medium at a printer, wherein reading and writing of the print data being performed using operating system commands, the method comprising:
supplementing an operating system command for writing data with a delay function;
adjusting a delay duration based on process identifier information detected by the delay function and corresponding to at least one read process; and
delaying the operating system command for writing data based on the process identifier information.

* * * * *